(12) United States Patent
Markowitz et al.

(10) Patent No.: US 8,850,834 B2
(45) Date of Patent: Oct. 7, 2014

(54) METHOD FOR CONTROLLING AN AIR CONDITIONING SYSTEM

(75) Inventors: Markus Markowitz, Cologne (DE);
Dietmar Fischer, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 305 days.

(21) Appl. No.: 13/227,058

(22) Filed: Sep. 7, 2011

(65) Prior Publication Data

US 2012/0060522 A1    Mar. 15, 2012

(30) Foreign Application Priority Data

Sep. 10, 2010 (DE) .......................... 10 2010 037 446

(51) Int. Cl.
*F25B 7/00* (2006.01)
*B60H 1/00* (2006.01)

(52) U.S. Cl.
CPC ............ *B60H 1/00778* (2013.01); *B60H 1/005* (2013.01); *B60H 1/00885* (2013.01)
USPC ................................................ 62/79; 62/244

(58) Field of Classification Search
CPC ............ F25B 7/00; F25B 13/00; F25B 29/00; F25B 1/00; F25B 3/00; B60H 1/32
USPC .......................... 62/79, 159, 244, 498; 165/42
See application file for complete search history.

(56) References Cited

U.S. PATENT DOCUMENTS

| | | | | |
|---|---|---|---|---|
| 6,059,016 A * | 5/2000 | Rafalovich et al. | ............. | 165/41 |
| 6,427,472 B1 * | 8/2002 | Nakagawa et al. | ............. | 62/430 |
| 6,751,968 B2 * | 6/2004 | Takano | ........................... | 62/159 |
| 6,755,033 B2 * | 6/2004 | Iwanami et al. | ................ | 62/133 |
| 8,285,443 B2 * | 10/2012 | Akahoshi et al. | ............... | 701/36 |
| 2002/0157412 A1 * | 10/2002 | Iwanami et al. | ................ | 62/236 |
| 2003/0041603 A1 * | 3/2003 | Tada et al. | ........................ | 62/134 |
| 2003/0068232 A1 * | 4/2003 | Iwanami et al. | ............. | 417/212 |
| 2005/0109499 A1 * | 5/2005 | Iwanami et al. | ............. | 165/202 |
| 2006/0032623 A1 * | 2/2006 | Tsubone et al. | ............. | 165/202 |

FOREIGN PATENT DOCUMENTS

| | | |
|---|---|---|
| DE | 101 24 757 A1 | 11/2001 |
| DE | 102 48 773 A1 | 5/2004 |
| DE | 103 17 039 A1 | 10/2004 |

* cited by examiner

*Primary Examiner* — Mohammad M Ali
(74) *Attorney, Agent, or Firm* — Julia Voutyras; Alleman Hall McCoy Russell & Tuttle LLP (57) ABSTRACT

An air conditioning method is provided. The method comprises when a refrigerant circuit is in operation and a temperature of an evaporator of the refrigerant circuit is lower than a temperature of a heat exchanger of a heating circuit, transferring heat from the heat exchanger to air passing through the heat exchanger, and when the refrigerant circuit is not in operation and the temperature of the evaporator is higher than the temperature of the heat exchanger, transferring heat from the air passing through the heat exchanger to the heat exchanger. In this way, the heat exchanger functions to augment the cooling capabilities of the evaporator.

20 Claims, 6 Drawing Sheets

FIG. 1

METHOD FOR CONTROLLING AN AIR CONDITIONING SYSTEM

RELATED APPLICATIONS

This application claims priority to German Patent Application No. 102010037446.6, filed on Sep. 10, 2010, the entire contents of which is being incorporated herein by reference.

FIELD

The present disclosure relates to a method for controlling an air conditioner, in particular a heating, ventilation, and air conditioning system (HVAC) for a motor vehicle having a start/stop system.

BACKGROUND AND SUMMARY

In a motor vehicle with what is known as a start/stop system, the engine serving for propelling the motor vehicle is temporarily stopped or switched off automatically when drive energy for propelling the motor vehicle is not required, for example when the motor vehicle is waiting at traffic lights. Particularly in town traffic, start/stop systems of this type make a considerable contribution to reducing the fuel consumption. They are therefore sometimes used as standard in conventional motor vehicles and, for example, in low-energy vehicles, hybrid vehicles and the like.

If the engine of the motor vehicle at the same time also provides the drive energy for a refrigerating circuit of an air conditioning system, as is generally the case, for example when the engine drives a condenser or compressor of a compression refrigerating circuit by a belt drive, the result of automatically switching off the motor vehicle engine is that the condenser or compressor of the refrigerating circuit of the air conditioning system and therefore the refrigerating circuit of the air conditioning system are likewise temporarily put out of operation. When the compressor is switched off, the temperature of an evaporator operated as a cold exchanger of the air conditioning system therefore rises, so that, with the engine switched off, the air which is to be cooled by the refrigerating circuit and supplied, for example, to a passenger cell becomes warmer, this being detrimental to comfort.

Various embodiments of air conditioning systems have already been proposed in order to solve this problem. Thus, for example, DE 101 24 757 A1 relates to a vehicle air conditioning system in which a cold accumulator is arranged between an air-downstream side of a cooling heat exchanger and an air-upstream side of an air-mixing flap, in order to be cooled by cold air which passes through the cooling heat exchanger. The cold accumulator can in this case be cooled by the cold air from the cooling heat exchanger, and, moreover, the cold accumulator is arranged on the air-upstream side of the air-mixing flap and can be cooled, without being adversely affected by a rotary position of the air-mixing flap.

Furthermore, DE 103 17 039 A1 discloses a device for regulating the air supply with an evaporator and with a heating body, an airstream being apportioned to at least two air ducts. A first air duct conducts the corresponding first part airstream through the evaporator and the heating body, and a second air duct leads the corresponding second part airstream past the evaporator and the heating body. Furthermore, the use of a device of this type in an air conditioning system in a motor vehicle is proposed.

Moreover, DE 102 48 773 B4 describes an air conditioning system for a motor vehicle, the engine of which is switched off correspondingly to an automatic stop-and-go mechanism in order to save energy when the motor vehicle is briefly at a standstill. The air conditioning system has a compression refrigerating circuit drivable via the engine and at least one short-time cold accumulator which is chargeable with cold via the compression refrigerating circuit and which is intended, in particular, to be discharged when the engine is switched off because the motor vehicle is briefly at a standstill. In this operating state, the air conditioning system changes over automatically to a circulating-air operating mode, at least one short-time cold accumulator being arranged in at least one circulating-air duct.

The inventors herein have recognized the above issues and provide a method to at least partly address them. A method for controlling an air conditioning system, in particular an HVAC system for a motor vehicle having a start/stop system, is provided. The method comprises when a refrigerant circuit is in operation and a temperature of an evaporator of the refrigerant circuit is lower than a temperature of a heat exchanger of a heating circuit, transferring heat from the heat exchanger to air passing through the heat exchanger, and when the refrigerant circuit is not in operation and the temperature of the evaporator is higher than the temperature of the heat exchanger, transferring heat from the air passing through the heat exchanger to the heat exchanger.

The transfer of heat from and to the heat exchanger takes place only when it is established that cooling power is required by the air conditioning system. This is the case, for example, when a desired cooling temperature of, for example, a passenger cabin to be cooled in a motor vehicle, is lower than an actual cooling temperature. As a result, the additional load upon the air conditioning system which is required in order to cool the heat exchanger can be restricted to those times when the cold accumulator function could be used anyway, to be precise when the air conditioning system is used for cooling. This ensures especially energy-efficient operation of the air conditioning system in spite of a cold accumulator function which is additionally present.

This affords the advantage that, by the heating circuit being used to cool air provided to the passenger cabin, additional equipment for providing (temporary) cooling function may be dispensed with. According to the disclosure, only the sub-assemblies or components usually installed in an air conditioning system, in particular an HVAC system, are used, so that no additional structural parts which would result in an increase in weight are required in order to provide the cooling function. Furthermore, retrofitting of existing air conditioning systems without a cold accumulator function can likewise be implemented in an especially simple and cost-effective way by the method according to the disclosure, since the components present in the air conditioning system are to be controlled by the method according to the disclosure.

It should be pointed out that the features listed individually in the patent claims may be combined with one another in any desired technically expedient way and indicate further refinements of the invention. The description additionally characterizes and specifies the invention particularly in conjunction with the figures.

DETAILED DESCRIPTION

Figure 1:
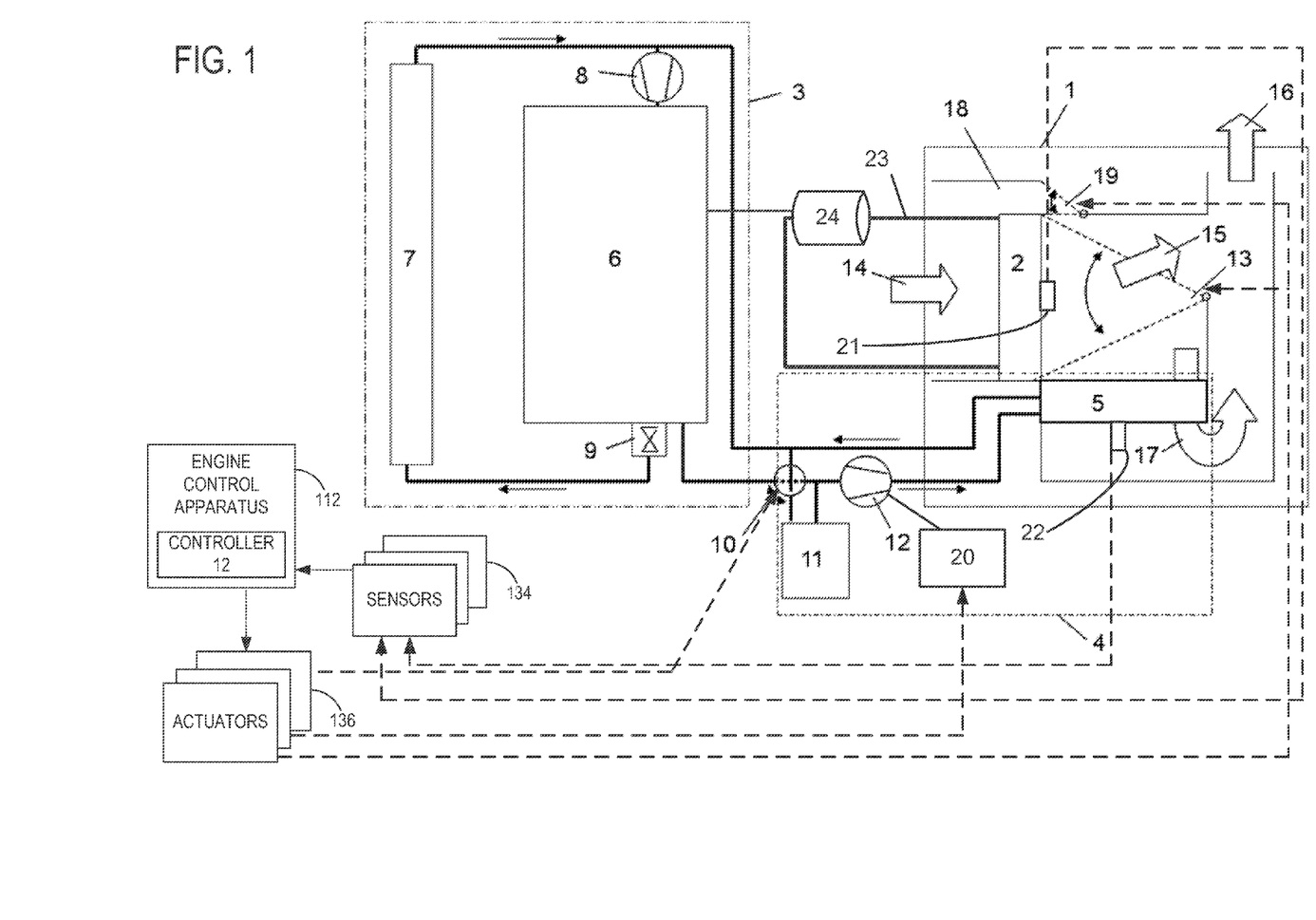
FIG. 1 shows a diagrammatic illustration of an air conditioning system according to an exemplary embodiment of the present disclosure.

FIG. 1 illustrates diagrammatically an air conditioning system 1 according to an exemplary embodiment of the present disclosure. The air conditioning system 1 depicted is, in particular, an HVAC system for a motor vehicle, not illustrated in FIG. 1, having a start/stop system. As can be gathered from FIG. 1, the air conditioning system 1 has a refrigerant circuit 23 with an evaporator 2 and a compressor 24, and has a heating circuit 4 having a heat exchanger 5 connected in a fluid-conducting manner to a coolant circuit 3.

The refrigerant circuit 23 includes a compressor 24 driven by the engine 6 via a belt. Coupled to the compressor 24 is an evaporator 2. The evaporator 2 cools air passing through it, and is itself cooled by the evaporation of fluid provided by the compressor 24. Refrigerant circuit 23 also includes other components not illustrated in FIG. 1, such as a condenser.

The coolant circuit 3 has a substantially conventional set-up, as illustrated in FIG. 1, and comprises an engine 6 of the motor vehicle, for example an internal combustion engine or an electric motor, which is connected in a fluid-conducting manner to a radiator 7. The fluid, for example water or coolant, contained in the coolant circuit 3 is circulated by a coolant pump 8, which in some embodiments is driven by the engine 6. Furthermore, FIG. 1 illustrates a thermostat 9 which in a known way connects the radiator 7 in a fluid-conducting manner to the coolant circuit 3 or separates it from the latter as a function of the coolant temperature of the coolant circuit 3 or the operating temperature of the engine 6.

As has already been described above, the coolant circuit 3 is connected in a fluid-conducting manner to the heating circuit 4, that is to say the same fluid circulates in the heating circuit 4 as in the coolant circuit 3, for example water or coolant. As may be gathered, furthermore, from FIG. 1, between the coolant circuit 3 and the heating circuit 4 is arranged a controllable valve 10, for example a throughflow control valve, by which the heating circuit 4 can be separated from the coolant circuit 3 or can be connected in a fluid-conducting manner to the latter. Moreover, according to the exemplary embodiment illustrated, the valve 10 is also designed to connect a fluid accumulator tank 11 in a fluid-conducting manner to the heating circuit 4 or separate it from the latter. Expediently, the controllable valve 10 is, for example, a multiway control valve, to which both the coolant circuit 3 and the fluid accumulator tank 11 are connected, so that, by way of a single control command from a controller 100, the coolant circuit 3 is separated from the heating circuit 4 and at the same time the fluid accumulator tank 11 is connected in a fluid-conducting manner to the heating circuit 4.

So that sufficient circulation of the fluid contained in the heating circuit 4 and in the accumulator tank 11 is ensured, according to the exemplary embodiment a fluid pump 12 is arranged in the heating circuit 4. The fluid pump 12 may be powered by a motor 20 coupled to the fluid pump 12. The motor 20 may be operable to power the fluid pump 12 via one or batteries or alternators, which will be described below in more detail with respect to FIG. 2. The flow directions of the fluid in the coolant circuit 3 and in the heating circuit 4 are identified by corresponding arrows in FIG. 1.

Furthermore, the air conditioning system 1 illustrated in FIG. 1 comprises a first airflow control device 13, for example a temperature control flap, by which the incoming air 14 which flows through the evaporator 2, and which is supplied, for example by a blower not illustrated in FIG. 1, as fresh air or outside air from the surroundings outside the motor vehicle or as circulating air from a passenger cabin, likewise not illustrated, to the evaporator 2, can also be supplied selectively, at least in part, to the heat exchanger 5. The airflow control device 13 is located downstream of the evaporator and is advantageously designed in such a way as to control or set continuously the fraction of the air quantity supplied to the heat exchanger 5 in relation to the air quantity flowing through the evaporator 2 within a range of about 0% to about 100%, as may be gathered in FIG. 1 from two dashed lines illustrated as delimiting the airflow control device 13 and from a corresponding curved arrow.

The outgoing air 15 not supplied to the heat exchanger 5 by the airflow control device 13 is expediently led past the heat exchanger 5 and blown as conditioned air 16, for example, into a passenger cabin. As can likewise be seen from FIG. 1, the heat exchanger air 17 flowing through the heat exchanger 5 is subsequently mixed with the outgoing air 15 bypassing the heat exchanger 5 and supplied, for example, to the passenger cabin as conditioned air 16. By the incoming air 14 being divided into an outgoing air fraction 15 and a heat exchanger air fraction 17, the temperature of the conditioned air 16 can be controlled in a simple way by the airflow control device 13 and adapted to the current cold or heat requirement of, for example, the passenger cabin.

Moreover, according to the exemplary embodiment illustrated in FIG. 1, the air conditioning system 1 has an openable and closable bypass passage 18 and also a further second airflow control device 19, for example a controllable air flap, arranged upstream of the evaporator at the bypass passage 18. By the bypass passage 18, the incoming air 14 which is supplied to the air conditioning system 1 from the surroundings outside the motor vehicle as fresh air or outside air or from a passenger cabin as circulating air can be led past both the evaporator 2 and the heat exchanger 5. Preferably the bypass passage 18 is both completely openable and closable and only partially openable and closable by the airflow control device 19, so that the temperature of the conditioned air 16 can be set and controlled within a wide range by being supplied and mixed with non-conditioned outside or circulating air.

The engine control apparatus 112 may include an engine controller 111. The engine controller 111 may be coupled to various sensors 134 and may be configured to receive a variety of sensor signals from the various sensors 134. The sensors 134 may include temperature sensor 21 and 22, which are configured to provide an indication of the temperature of the air passing through the evaporator and heat exchanger, respectively, a vehicle speed sensor, a throttle opening-degree sensor, an engine rotational speed sensor, a battery state of charge sensor, an ignition switch sensor, a brake switch sensor, a gear sensor, a driver request sensor, engine coolant temperature sensor, intake temperature sensor, exhaust temperature sensor, and various pressure sensors. The engine control apparatus 112 may also be coupled to various actuators 136 of the vehicle system and may be further configured to control the operation of the various actuators 136, including the valve 10, the fluid pump motor 20 and the airflow control devices 13 and 19.

Figure 2:
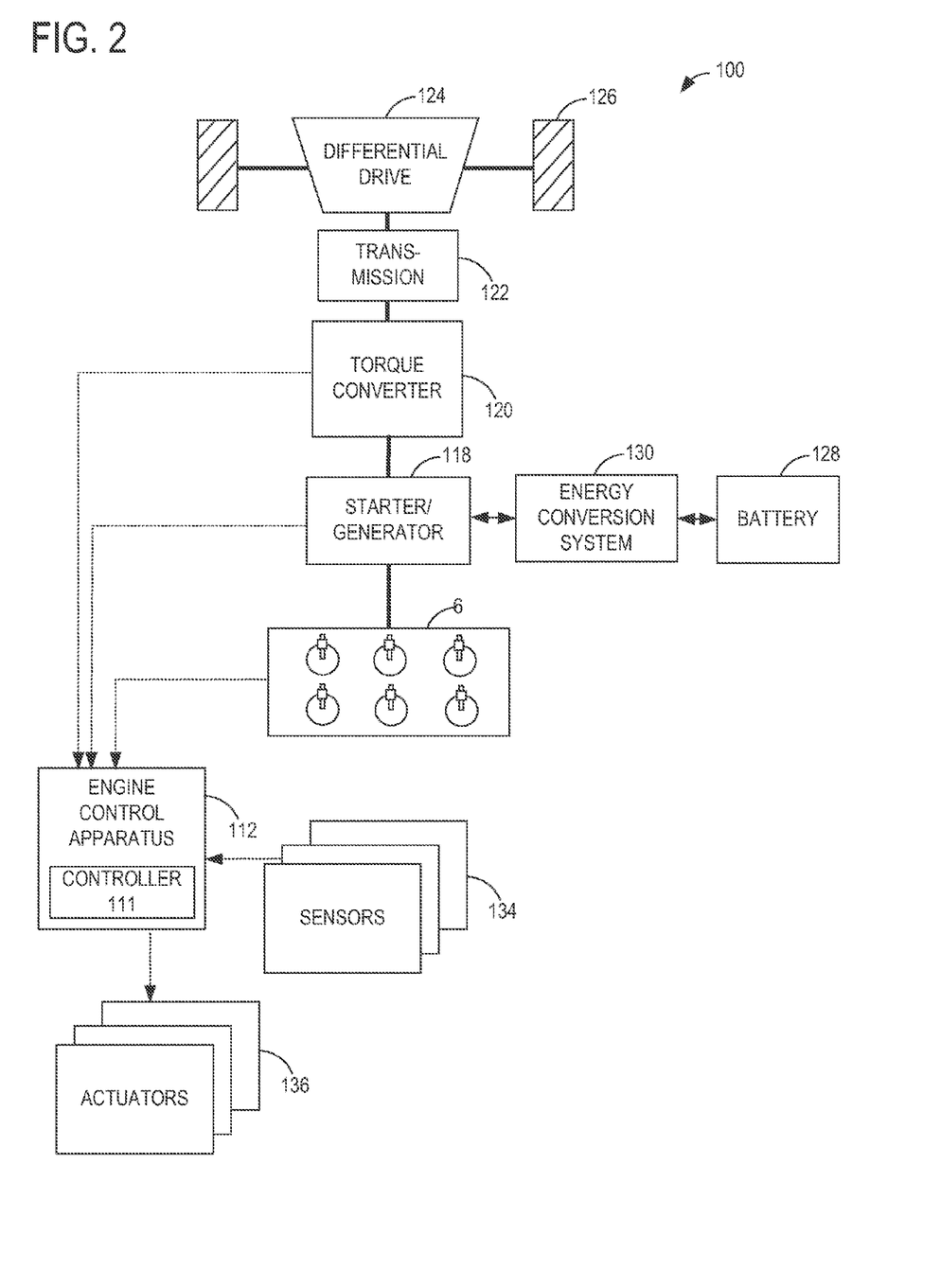
FIG. 2 shows a schematic depiction of an example vehicle system according to an embodiment of the present disclosure.

FIG. 2 is a diagram illustrating an example vehicle system 100 which utilizes the engine control apparatus 112 for controlling engine operation of the engine 6 that may be shut-down during engine idle stop conditions. The example vehicle system 100 is shown as a parallel hybrid electrical vehicle system. It will be appreciated that in alternate embodiments of vehicle system 100, other engine and vehicle configurations may be possible, for example, the vehicle system may be a series hybrid electrical vehicle system, or a non-hybrid electrical vehicle system, such as a gasoline vehicle system or a diesel vehicle system.

In the example vehicle system 100 shown in FIG. 2, the driving force of the vehicle system may be generated by the engine 6 and/or an electric motor of the starter/generator 118 coupled to the engine 6. The driving force to the driving wheels 126 (e.g., front wheels), from the engine 6 and/or the starter/generator 118 is provided via a torque converter system 120, a transmission system 122, and a differential drive system 124. The starter/generator 118 may be powered with electrical power supplied by battery 128. An energy conversion system 130 may be coupled between the starter/generator 118 and the battery 128 to convert the electrical power to a desired form, such as a desired voltage, current, and/or current type (e.g., AC or DC).

When the driving force provided by the engine 6 is not sufficient to meet a requested driving force, electrical power from the battery 128 may be used to supplement the engine 6 via the starter/generator 118. Alternatively, when the engine 6 is shut-down (for example during engine idle stop conditions), electrical power from the battery 128 may be used as the sole source of driving force. On the other hand, when the driving force provided by the engine 6 is in excess of a requested driving force, the excess driving force generated by the engine 6 may be converted to electrical power by the starter/generator 118 and stored in the battery 128. Similarly, at regenerative braking, the driving force may be transmitted from the driving wheels 126 back to the starter/generator 118 to be converted to electrical power and subsequently stored in the battery 128.

The engine control apparatus 112 may be further configured to automatically stop engine operation during selected conditions, such as an idle condition for example, without a driver requesting engine shut down. The engine control apparatus 112 may be configured to continue providing cooled air to the passenger cabin under such conditions, when desired, as described below by the flow charts illustrated in FIGS. 3-5. It should be understood that the processes indicated in the respective flow charts can be executed in a known way by a correspondingly designed control device, for example controller 111.

Figure 3:
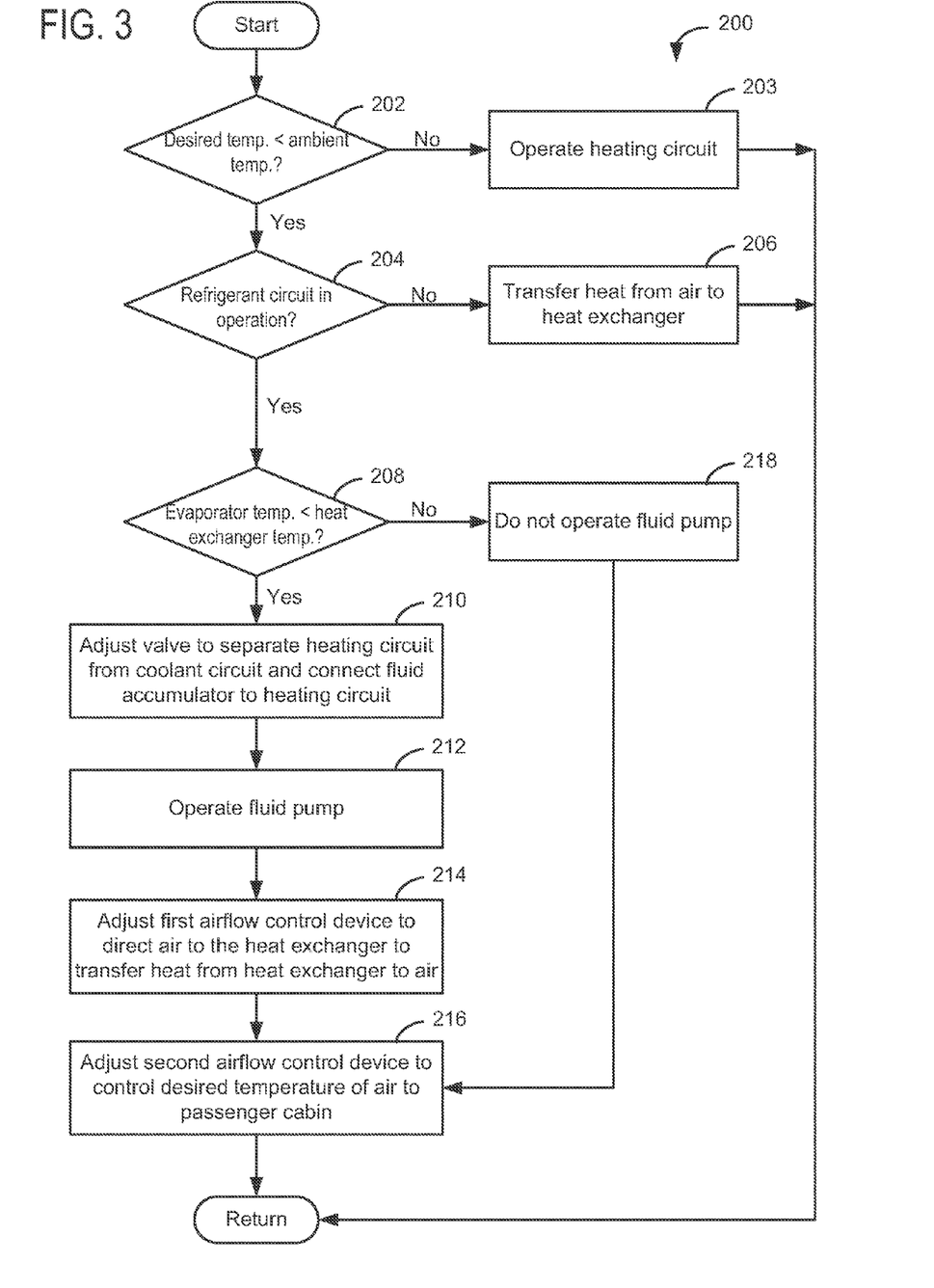
FIG. 3 shows a flow chart illustrating an example operation to transfer heat from a heat exchanger to air according to the exemplary embodiment.

The flow chart illustrated in FIG. 3 illustrates the process of cooling the heating circuit 4, according to the exemplary embodiment described herein. Method 200 comprises, at 202, determining if desired passenger cabin temperature is lower than ambient temperature, or lower than the temperature of air currently being supplied to the cabin. If the desired temperature is not lower, additional cooling is not indicated, and thus method 200 proceeds to 203 to operate the heating circuit as a heater. Operation of the heating circuit as a heater will be described in more detail below with regard to FIG. 5. If it is established, in general, that cooling power is required by the air conditioning system 1, this being the case, for example, when a desired temperature of a passenger cabin is lower than an ambient temperature or actual temperature of the passenger cabin, method 200 proceeds to 204 to determine whether the refrigerant circuit of the air conditioning system 1 is in operation. If the engine 6 of the motor vehicle drives, for example, a compressor of the refrigerant circuit via a belt drive, the operating state of the refrigerant circuit can also be determined, for example, via the operating state of the engine 6 or compressor.

Figure 4:
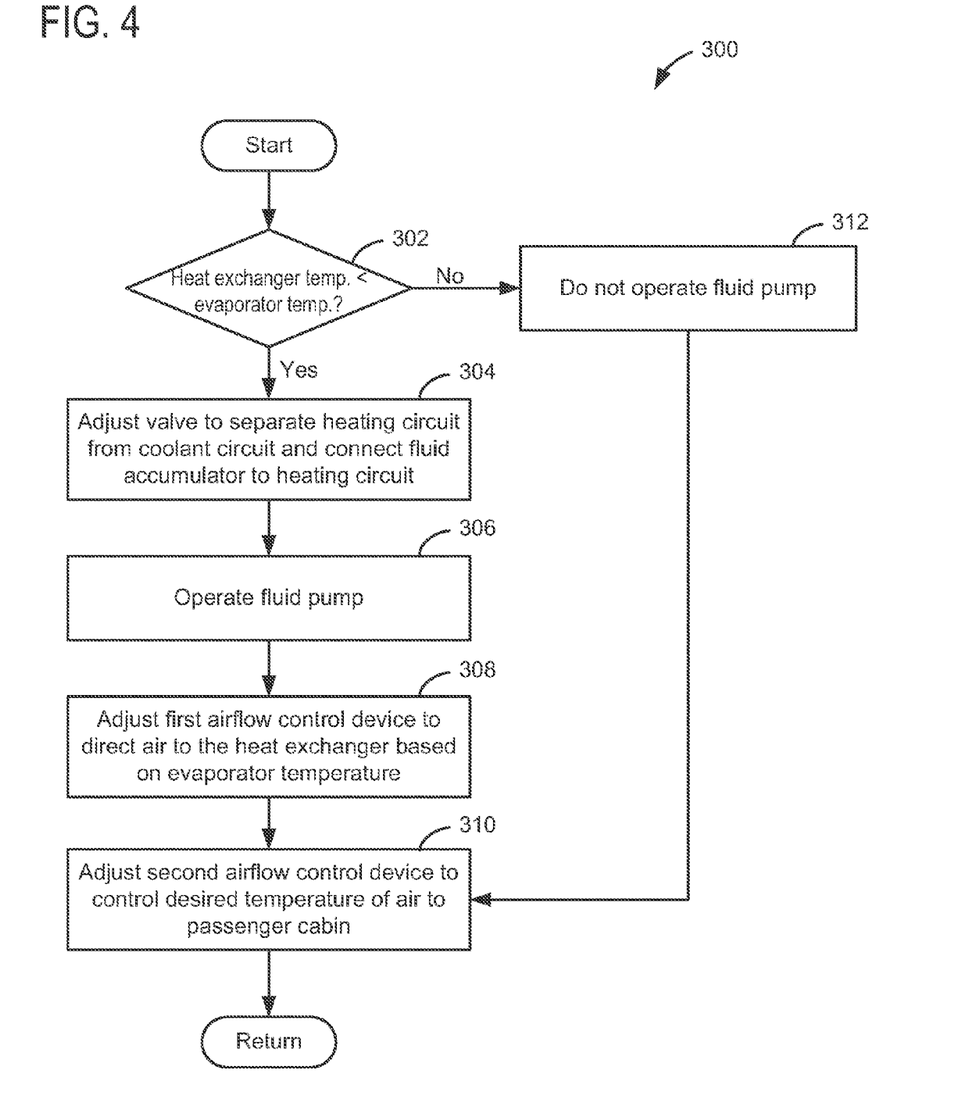
FIG. 4 shows a flow chart illustrating an operation to transfer heat from air to the heat exchanger according to the exemplary embodiment.

If the result is ascertained to be "no" in 204, that is to say the refrigerant circuit is not in operation, for example during an automatic stop of the engine, in the exemplary embodiment the method 200 according to the disclosure continues to 206 to transfer heat from air passing through the heat exchanger to the heat exchanger, which may be executed by method 300 in FIG. 4, described in more detail below.

If the result is "yes" at 204, that is to say the refrigerant circuit is in operation, in the exemplary embodiment the method according to the disclosure continues to 208 in which it is determined whether the temperature of the refrigerant circuit or of the evaporator 2 is lower than the temperature of the heating circuit 4 or of the heat exchanger 5. This may be determined by the temperature sensors 21 and 22, which detect the temperature of the air just after passing through the evaporator and heat exchanger. If it is established in 208 that the result is "yes", in the exemplary embodiment the method according to the disclosure continues to 210 in which the heating circuit 4 is separated from the coolant circuit 3 by the valve 10, in particular a multiway control valve. The fluid accumulator tank 11 is likewise connected in a fluid-conducting manner to the heating circuit 4 by the valve 10. At 212 of the illustrated exemplary embodiment of the method 200 according to the disclosure, the fluid pump 12 is put into operation in order to circulate the fluid contained in the heating circuit 4, heat exchanger 5 and fluid accumulator tank 11.

At 214, by control the first airflow control device 13, in particular a temperature control flap, at least part of the incoming air 14 flowing through the evaporator 2 and cooled by this is supplied to the heat exchanger 5. This air therefore passes through the heat exchanger 5 and heat from the heat exchanger and the fluid of the heating circuit 4 circulating through the heat exchanger 5 by the fluid pump 12 is transferred to the air. As a result, the heating circuit 4, the heat exchanger 5 and the fluid contained in the heating circuit 4 are cooled. After flowing through the heat exchanger 5, the heat exchanger air 17 is preferably mixed with the outgoing air 15 not supplied to the heat exchanger 5.

Moreover, at 216 of the method according to the disclosure in the exemplary embodiment, the temperature of the conditioning air 16 is controlled further by admixing non-conditioned air which flows through the bypass passage 18 and the quantity of which is determined by control of the second airflow control device 19, in particular a controllable air flap. Subsequently, the conditioning air 16, the temperature of which is suitably controlled in this way, is supplied, for example, to a passenger cabin of the motor vehicle.

If it is found that the result is "no" at 208 discussed above, in the exemplary embodiment the method 200 according to the disclosure continues to 218 in which the fluid pump 12 is put out of operation, since the ability of the air passing through the heat exchanger to accept heat transferred from the heating circuit 4 is exhausted because, as was found at 208, the temperature of the refrigerant circuit or of the evaporator 2 is no longer lower than the temperature of the heating circuit 4 or of the heat exchanger 5. Subsequently, in the exemplary embodiment, the method 200 according to the disclosure continues to 216, already described, in which the temperature of the conditioning air 16 is controlled according to stipulated temperature desired values, which conditioning air is subsequently supplied, for example, to a passenger cabin.

In some embodiments, the temperatures of the refrigerant circuit and of the heating circuit 4 are determined by suitable temperature measurement methods. In particular, for this purpose, the temperature of the fluid circulating in the refrigerant circuit or in the heating circuit 4 can be measured directly, that is to say in the fluid, by appropriate sensors, or the temperature of the air can be measured after it flows through the evaporator 2 or heat exchanger 5 by sensors 21 and 22.

After controlling the temperature of the conditioning air 16 has been executed, in the exemplary embodiment, the method 200 according to the disclosure returns, so that the process is executed again, as described.

As already explained further above, in the exemplary embodiment the method 200 branches off to when it is determined that the result is "no" in at 206 illustrated in FIG. 3, and transfers heat from the air to the heat exchanger. A method 300, depicted in FIG. 4, illustrates transferring heat from the air to the heating circuit 4.

The transfer is executed when, in general, cooling power is required by the air conditioning system 1, this being the case, for example, when a desired temperature of a passenger cell is lower than an ambient temperature or actual temperature of the passenger cell. Further, the transfer is executed when the engine is not in operation, such as during an automatic idle stop. Method 300 comprises, at 302, determining whether the temperature of the heating circuit 4 or of the heat exchanger 5 is lower than the temperature of the refrigerant circuit or of the evaporator 2. If it is established at 302 that the result is "yes", in the exemplary embodiment the method 300 according to the disclosure continues to 304 to adjust the control valve to separate the heating circuit from the coolant circuit and connect the fluid accumulator to the heating circuit. At 306, the pump is operated, and at 308, the first airflow control device is adjusted to direct air to the heat exchanger based on the temperature of the evaporator. For example, a short period of time after the refrigerant circuit is switched off, the residual cold temperature of the refrigerant circuit or the evaporator 2 is still sufficient to cool the air 14 flowing through the evaporator 2. However, with an increasing period of time during which the operating state is switched off, the temperature of the refrigerant circuit or evaporator 2 rises and is no longer sufficient for cooling the incoming air 14. At 308, by control of the first airflow control device 13, in particular a temperature control flap, at least part of the incoming air 14 flowing through the evaporator 2 is then supplied to the heat exchanger 5. When it flows through the heat exchanger 5, the heat exchanger air 17 is cooled by the fluid circulating in the heating circuit 4, and heat from the air is transferred to the heat exchanger 5, cooling the air.

Furthermore, at 308, in the exemplary embodiment the fraction of the air flowing through the heat exchanger 5 is increased with an increasing temperature of the evaporator 2 or refrigerant circuit, so that sufficient cooling of the heat exchanger air 17 flowing through the heat exchanger 5 is ensured over a sufficiently long period of time. After flowing through the heat exchanger 5, the heat exchanger air 17 is preferably mixed with the outgoing air 15 not supplied to the heat exchanger 5.

At 310, the second airflow control device 19 is adjusted to control the temperature of air provided to the passenger cabin.

If it is found that the result is "no" in 302 explained above, in the exemplary embodiment the method 300 according to the disclosure continues to 312 in which the fluid pump 12 is put out of operation, that is to say switched off, since the heating circuit 4 cannot cool any further the air flowing through the heat exchanger 5 because, as was found at 302, the temperature of the heating circuit 4 or of the heat exchanger 5 is no longer lower than the temperature of the refrigerant circuit or evaporator 2. Subsequently, in the exemplary embodiment, the method according to the disclosure continues to 310, already described, in which the temperature of the conditioning air 16 is controlled according to stipulated temperature desired values.

After 310 has been executed, in the exemplary embodiment the method according to the disclosure returns to execute methods 200 and/or 300 again, as described.

Figure 5:
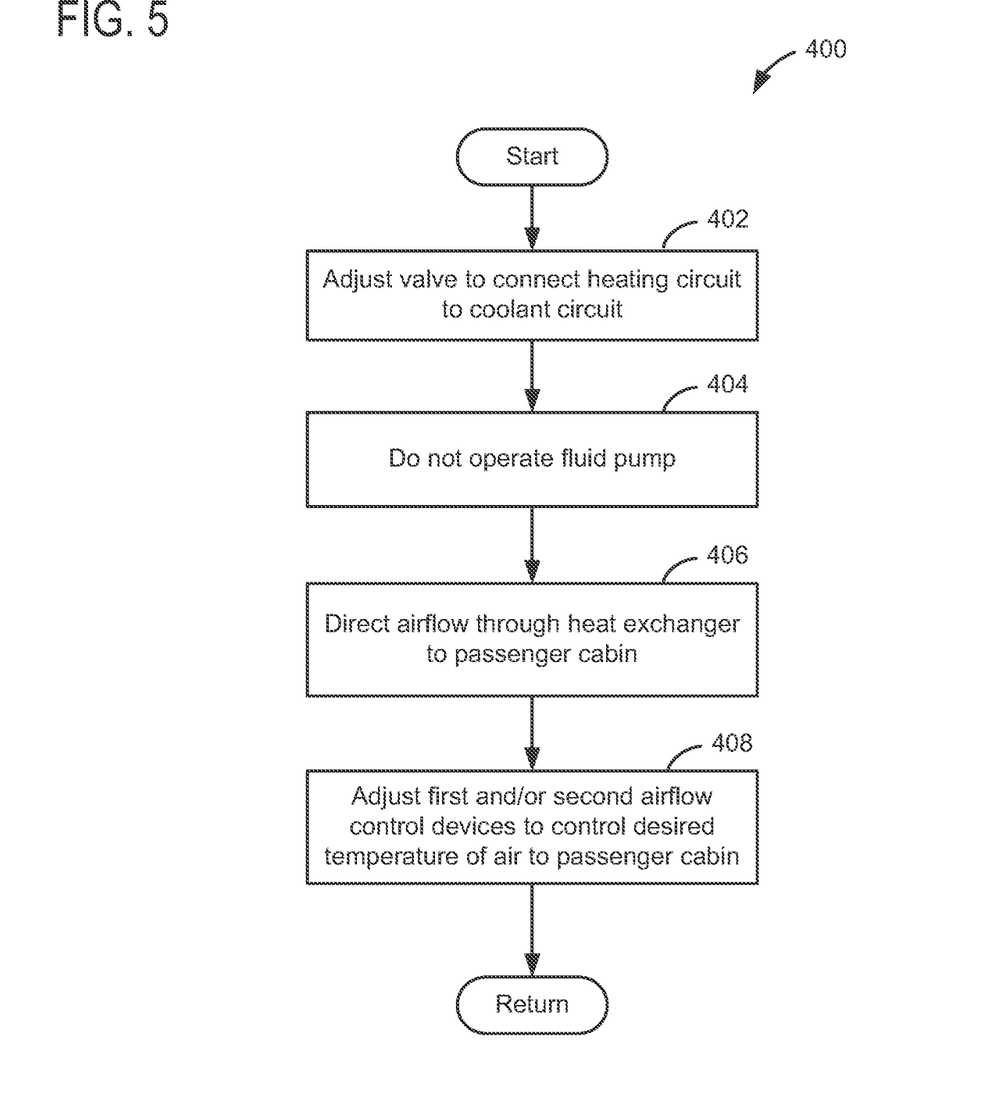
FIG. 5 shows a flow chart illustrating an operation to heat a passenger cabin according to the exemplary embodiment.

Turning to FIG. 5, a method 400 for operating the heating circuit as a heater is illustrated. Method 400 may be carried out after the determination that the desired passenger cabin temperature is higher than the current temperature, for example, in response to a "no" determination at 202 of method 200, described with respect to FIG. 3. Method 400 comprises, at 402, adjusting the control valve 10 to connect the heating circuit to the coolant circuit. In this way, coolant that has been routed through the engine 6 may be directed to the heat exchanger 5, and thus heat from the engine 6 is transferred to the heat exchanger 5. As coolant from the engine is routed to the heat exchanger, not coolant from the fluid accumulator 11, the pump 12 is not operated at 404.

Airflow is directed to the passenger cabin through the heat exchanger 5 at 406. In order to control the temperature of the air entering the passenger cabin, the first and/or second airflow control devices may be adjusted at 408 to bypass airflow through the heat exchanger 5.

The method according to the disclosure for controlling an air conditioning system is not restricted to the exemplary embodiment described herein and shown in the figures.

In a preferred version, the method according to the disclosure for controlling an air conditioning system, in particular an HVAC heating air conditioning system, is used for a motor vehicle with start/stop system, in which an engine of the motor vehicle also drives the refrigerant circuit of the air conditioning system, for example by the compressor 24 coupled to the engine 6 via a belt drive, and the heating circuit of the air conditioning system is connected in a fluid-conducting manner to a cooling circuit of the engine.

Figure 6:
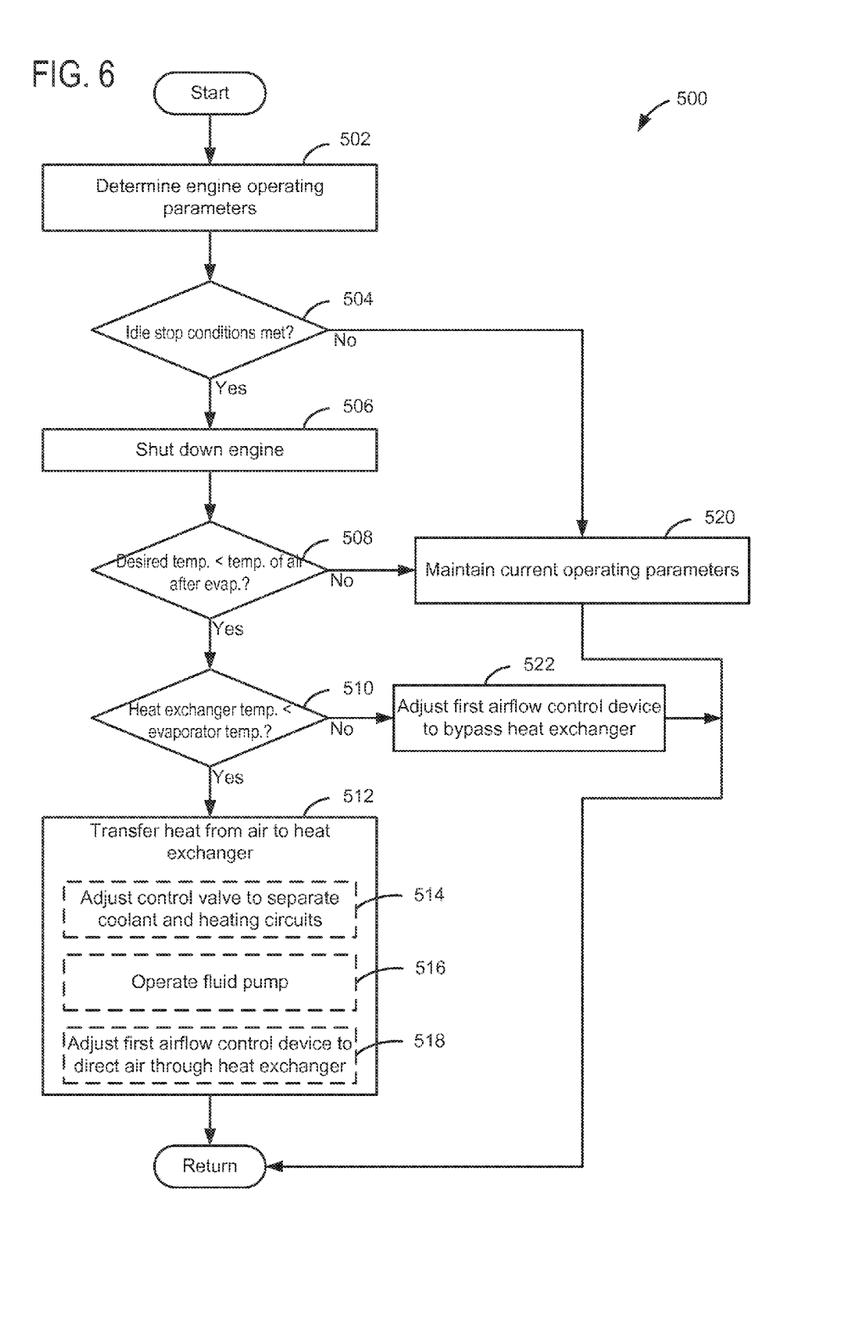
FIG. 6 shows a flow chart illustrating an operation for providing cooled air to a passenger cabin in a vehicle having a start/stop system.

FIG. 6 is a flow chart illustrating an example method 500 for providing cooled air to a passenger cabin in a vehicle having a start/stop system. Method 500 comprises, at 502, determining engine operating parameters. Engine operating parameters may include engine speed, load, driver requested torque, brake pedal position, etc. At 504, it is determined if idle stop conditions have been met. Idle stop conditions may include that engine 6 is operating (e.g., carrying out combustion), the state of charge (SOC) of battery 128 is above a threshold, the motor of starter/generator 118 is operation ready, vehicle running speed is within a desired range (e.g. less than 30 mph), intake air temperature is estimated and/or measured to be within a selected temperature range, the driver requested torque less than a predetermined threshold value, etc. If idle stop conditions are not met, method 500 proceeds to 520 to continue to maintain current operating conditions. If idle stop conditions are met, method 500 advances to 506 to shut down the engine.

At 508, it is determined if a desired passenger cabin temperature is less than the temperature of the air after passing through the evaporator. If the desired temperature is not less than the air temperature after the evaporator, method 500 proceeds to 520 to continue to operate under current operating parameters. If the desired air temperature is less than the evaporator air temperature, additional cooling to the air to the passenger cabin is desired, and because the engine is not operating due to the idle stop, the refrigerant circuit is not operating and thus cannot provide sustained cooled air to the cabin. Method 500 then proceeds to 510 to determine if the temperature of the heat exchanger is less than the temperature of the evaporator. If not, method 500 proceeds to 522 to adjust the first airflow control device to bypass the heat exchanger, as it is not cool enough to provide additional cooling to the air. If the temperature of the heat exchanger is less than the temperature of the evaporator, method 500 proceeds to 512 to transfer heat from the air to the heat exchanger. Transferring heat from the air to the heat exchanger includes adjusting the control valve to separate the coolant circuit from the heating circuit at 514, operating the fluid pump at 516, and adjusting the first airflow control device to direct air through the heat exchanger at 518.

Thus, method 500 provides for providing cooled air to the passenger cabin during an engine idle stop. During an engine idle stop, the engine is not operating and as a result the air conditioning compressor is not operating, making sustained cooling of the air provided to the passenger cabin difficult. By routing the air through the heat exchanger, additional cooling to the air may be provided.

In an advantageous embodiment of the above described methods, at least part of the air flowing through the evaporator is supplied to the heat exchanger by an airflow control device, for example a temperature control flap. The airflow control device is expediently designed to control continuously the fraction of the air quantity supplied to the heat exchanger in relation to the air quantity flowing through the evaporator within a range of about 0% to about 100%. The fraction of air not supplied to the heat exchanger is led past the heat exchanger by the airflow control device and, for example, is available directly for cooling a passenger cabin of a motor vehicle.

By such a distribution of the airflow, for example, it is possible during the cooling of the heat exchanger to pass air cooled by the evaporator through the heat exchanger and thus to cool said heat exchanger and also the fluid contained in it or in the heating circuit. Moreover, it is ensured that sufficient cooling power, for example for cooling the passenger cell, is nevertheless available. Furthermore, the heat transferred from the air to the heating circuit and therefore the refrigerating power provided by the heating circuit operated as a cooler can be controlled.

Preferably, the air quantity supplied to the heat exchanger is controlled as a function of a temperature difference between the refrigerant circuit or the evaporator and the heating circuit or the heat exchanger by an airflow control device. Preferably, when cooling the heat exchanger, the air quantity supplied to the heat exchanger is increased by the airflow control device, the lower the temperature of the evaporator or of the refrigerant circuit is, as compared with the temperature of the heat exchanger or heating circuit, that is to say the greater the amount of temperature difference between these circuits. This ensures that the heating circuit is cooled as quickly as possible.

When the temperature of the heat exchanger is less than that of the evaporator, the air quantity supplied to the heat exchanger is likewise preferably increased by the airflow control device, but in this case the higher the temperature of the evaporator or refrigerant circuit is, as compared with the temperature of the heat exchanger or heating circuit, that is to say the greater the amount of temperature difference between these circuits. This enables the heat exchanger to be operated optimally in terms of energy utilization and energy storage, since, after the refrigerant circuit has been switched off, the residual cooling of the heat exchanger is first used further for cooling the air flowing through the evaporator. Thus, only that heat transfer from the air which is required for cooling the air further to a stipulated desired cooling temperature is transferred to the heating circuit.

In a further advantageous refinement of the disclosure, the separation of the heating circuit from the coolant circuit is achieved by a controllable valve, for example a throughflow control valve, which is closed when provided air conditioned air to the passenger cabin. By the heating circuit being separated from the coolant circuit, in particular a coolant circuit of a motor vehicle engine, only the heating circuit, the heat exchanger and the fluid contained in the heating circuit are used as additional cooling components. The coolant circuit otherwise connected in a fluid-conducting manner to the heating circuit is not affected by this function. On the one hand, this makes it possible to use the same fluid both for the coolant circuit and for the heating circuit, so that the heating circuit, when not used to cool the air, which is usually the case when no cooling power is required by the air conditioning system, can be provided for the dispensing of heating power by the fluid circulating in the coolant circuit and, for example, heated by a motor vehicle engine. On the other hand, the fluid contained in the heating circuit can also be used completely to cool the air, with the result that a high cooling capacity of the heating circuit can be achieved. An undesirable adverse influence of the fluid circulating in the coolant circuit and usually heated by the motor vehicle engine is avoided by the two circuits being separated from one another by the controllable valve, with the result that an optimal cooling capacity can be provided by the heating circuit.

According to an advantageous embodiment, the fluid-conducting connection of at least one fluid accumulator tank to the heating circuit is also controlled by a controllable valve, for example a throughflow control valve, which is opened to connect the tank to the circuit. The provision and the connection of at least one fluid accumulator tank to the heating circuit increase the fluid quantity available in the heating circuit and therefore the available cooling capacity of the heating circuit. Thus, in general, an increase in the fluid quantity in the heating circuit as a result of the greater accumulator capacity leads to a greater cooling capacity of the heating circuit, but also lengthens the time required for a complete cooling of the circuit.

The choice of at least one fluid accumulator tank having a suitably large volume makes it possible in any case, in an especially simple way, to adapt the cooling capacity of the heating circuit to stipulated operating conditions of the air conditioning system. Even during the operation, dynamic capacity adaptation by the connection or separation of one or more accumulator tanks in each case by a controllable valve may be envisaged. Thus, for example, if there is a high cooling requirement, such as is to be expected, for example, in the case of high outside temperatures or of town journeys with numerous stops, the cooling capacity could be increased and the comfort of the passengers thus ensured, while, in the case of a low cooling requirement, for example lower outside temperatures or of expressway journeys, the cooling capacity could be reduced and the air conditioning system thus operated in a more energy-efficient way.

Expediently, the at least one fluid accumulator tank is configured in such a way that the thermal losses of the fluid stored in it are as low as possible. For example, the fluid accumulator tank may be equipped with suitable heat or cold insulation.

Preferably, both the separation of the heating circuit from the coolant circuit and the connection of at least one fluid accumulator tank to the heating circuit take place by a single controllable valve, for example a multiway control valve.

This simplifies both the set-up of the air conditioning system and its control, since only one valve has to be installed and controlled.

In an expedient embodiment, the circulation of the fluid contained in the heating circuit is enabled by a fluid pump arranged in the heating circuit. Circulation ensures that the entire fluid contained in the heating circuit, not just the fluid contained in the heat exchanger, is available for cooling. Thus, the cooling capacity can be increased in a simple way, using the entire fluid quantity contained in the heating circuit.

In a further advantageous embodiment, when the engine is operated, the fluid pump is put into operation when it is established that the temperature of the refrigerant circuit or of the evaporator is lower than the temperature of the heating circuit or of the heat exchanger, and otherwise the fluid pump is put out of operation, and/or, when the engine is not operating, the fluid pump is put into operation when it is established that the temperature of the heating circuit or of the heat exchanger is lower than the temperature of the refrigerant circuit or of the evaporator, and otherwise the fluid pump is put out of operation. This makes it possible to operate the air conditioning system optimally, since, in the former, the fluid contained in the heating circuit is circulated only by the fluid pump, as long as the cooling capacity of the fluid is not yet exhausted, and/or, in the latter, the fluid is circulated only by the fluid pump as long as the fluid can be used for cooling the air flowing through the heat exchanger. In all other cases, the fluid pump is put out of operation, that is to say is stopped, and the energy consumption of the air conditioning system is reduced to a minimum.

In a further advantageous embodiment, air, in particular non-conditioned outside or circulating air, is led past the evaporator and the heat exchanger by an openable and closable bypass passage. This makes it possible, for example, to regulate the air temperature in a simple way, in that the air conditioned by the evaporator and/or the heat exchanger has additionally admixed to it the openable and closable bypass passage non-conditioned outside or circulating air which is subsequently supplied, for example, to a passenger cabin of a motor vehicle. Expediently, for this purpose, a further airflow control device, for example a controllable air flap, is arranged in the bypass passage or at an inlet or outlet orifice of the bypass passage.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An air conditioning method, comprising:
   when a refrigerant circuit is in operation, a refrigerant circuit compressor is on, and a temperature of an evaporator of the refrigerant circuit is lower than a temperature of a heat exchanger of a heating circuit, transferring heat from the heat exchanger to air passing from the evaporator through the heat exchanger;
   when the refrigerant circuit is not in operation, the refrigerant circuit compressor is off, and the temperature of the evaporator is higher than the temperature of the heat exchanger, transferring heat from the air passing from the evaporator through the heat exchanger to the heat exchanger; and
   when the refrigerant circuit is not in operation and when a desired temperature of a passenger cabin is above a current temperature of the passenger cabin, transferring heat from the heat exchanger to air passing from the evaporator through the heat exchanger.

2. The method as claimed in claim 1, further comprising directing air through the evaporator to the heat exchanger, at least part of the air flowing through the evaporator to the heat exchanger controlled by an airflow control device.

3. The method as claimed in claim 2, wherein the air supplied to the heat exchanger is controlled as a function of a temperature difference between the evaporator and the heat exchanger by the airflow control device.

4. The method as claimed in claim 1, further comprising separating the heating circuit from a coolant circuit by controlling a controllable valve.

5. The method as claimed in claim 4, further comprising connecting at least one fluid accumulator tank to the heating circuit by controlling a controllable valve.

6. The method as claimed in claim 5, wherein the separation of the heating circuit from the coolant circuit and the connection of at least one fluid accumulator tank to the heating circuit are controlled by a single controllable valve.

7. The method as claimed in claim 1, further comprising circulating fluid contained in the heating circuit by a fluid pump arranged in the heating circuit.

8. The method as claimed in claim 1, further comprising:
   a fluid pump being put into operation when it is established that the temperature of the evaporator is lower than the temperature of the heat exchanger, and the fluid pump otherwise being put out of operation; and
   the fluid pump being put into operation when it is established that the temperature of the heat exchanger is lower than the temperature of the evaporator, and the fluid pump otherwise being put out of operation.

9. The method as claimed in claim 1, further comprising directing air to bypass the evaporator and the heat exchanger through an openable and closable bypass passage.

10. An engine air conditioning system, comprising:
    a refrigerant circuit including at least one evaporator;
    a heating circuit including at least one heat exchanger;
    a coolant circuit connected in a fluid-conducting manner to the heating circuit; and
    a controller configured to:
      when the engine is operating and a temperature of the evaporator is lower than a temperature of the heat exchanger, transfer heat from the heat exchanger to air passing from the evaporator through the heat exchanger;
      when the engine is not operating and the temperature of the evaporator is higher than the temperature of the heat exchanger, transfer heat from the air passing from the evaporator through the heat exchanger to the heat exchanger; and when the engine is not operating and a desired temperature of a passenger cabin is above a current temperature of the passenger cabin, transferring heat from the heat exchanger to air passing from the evaporator through the heat exchanger.

11. The system of claim 10, wherein the controller is further configured to direct air from the evaporator and/or heat exchanger to the passenger cabin when the desired temperature of the passenger cabin is lower than the current temperature of the passenger cabin.

12. The system of claim 11, wherein the controller is further configured to adjust an amount of air directed to the heat exchanger by adjusting a first airflow control device located downstream of the evaporator.

13. The system of claim 11, wherein the controller is further configured to bypass airflow through the evaporator based on the desired passenger cabin temperature by adjusting a second airflow control device located upstream of the evaporator.

14. A vehicle method, comprising:
under a first condition, routing coolant from a fluid accumulator to a heat exchanger and directing airflow through an evaporator to the heat exchanger and to a passenger cabin of the vehicle to transfer heat from the heat exchanger to the air; and
under a second condition, routing coolant from the fluid accumulator to the heat exchanger while separating the coolant from a coolant circuit of an engine of the vehicle, and directing airflow through the evaporator to and the heat exchanger and to the passenger cabin to transfer heat from the air to the heat exchanger.

15. The method of claim 14, further comprising under a third condition, routing coolant through the coolant circuit of the engine of the vehicle to the heat exchanger, the third condition comprising a desired temperature of the passenger cabin being above a current temperature of the passenger cabin, and wherein the first and second conditions further comprise the desired temperature of the passenger cabin being below the current temperature of the passenger cabin.

16. The method of claim 15, wherein the routing coolant from the engine to the heat exchanger and routing coolant from the fluid accumulator to the heat exchanger further comprise controlling a controllable valve to direct coolant to the heat exchanger from the engine or from the fluid accumulator.

17. The method of claim 14, wherein the first condition further comprises the engine being in operation and a temperature of the heat exchanger exceeding a temperature of the evaporator.

18. The method of claim 14, wherein the second condition further comprises the engine not being in operation and a temperature of the evaporator exceeding a temperature of the heat exchanger.

19. The method of claim 14, wherein directing airflow through the evaporator and heat exchanger further comprises adjusting an airflow control device located downstream of the evaporator.

20. The method of claim 19, wherein the airflow control device is a first airflow control device, and further comprising adjusting a second airflow control device located upstream of the evaporator based on the desired temperature of the passenger cabin.

* * * * *